April 3, 1956 R. E. ZENNER 2,740,593

LEVEL WIND MECHANISM

Filed Feb. 20, 1953

INVENTOR
RAYMOND E. ZENNER.

BY George Sipkin
Paul W. Critchlow Jr.
ATTORNEYS

United States Patent Office 2,740,593
Patented Apr. 3, 1956

2,740,593

LEVEL WIND MECHANISM

Raymond E. Zenner, Hollywood, Ill., assignor, by mesne assignments, to the United States of America as represented by the Secretary of the Navy Application February 20, 1953, Serial No. 338,067

2 Claims. (Cl. 242—158)

Figure 1:
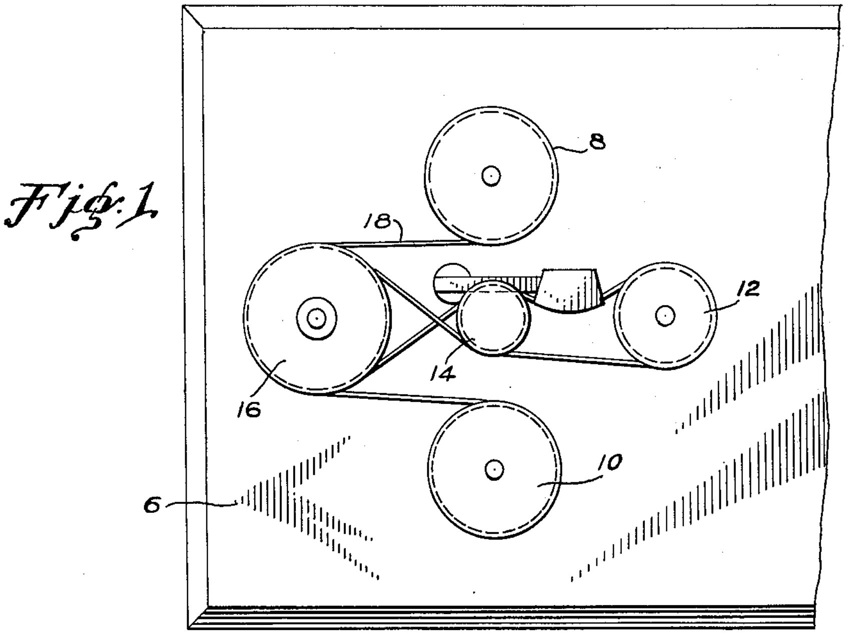

This invention relates to reciprocating mechanisms and, more particularly to reciprocating mechanisms for sound recorder level-wind apparatus.

In my copending patent application filed February 20, 1953, Serial No. 338,066, there is disclosed an improved wire path for the wire or tape of a sound recorder, or, in other words, a new arrangement of wire-guiding elements by means of which the wire is carried from a supply reel past a recording head and on to take-up reel. One of the elements of this new combination is a level-wind spool adapted to receive wire from the supply reel in a groove disposed at one level and also to pass the wire on to the take-up reel from another groove disposed at another level. One of the features of the invention there disclosed lies in the manner in which the undulating movement of the wire produced by the required reciprocations of the level-wind spool is smoothed-out into a straight line path as it traverses the recording head so as to eliminate undesirable sound interferences otherwise frequently occurring and also to minimize wear of the recording head.

As noted above, the present invention relates to the mechanism used to reciprocate such a level-wind spool. In prior practices, it has been customary to provide some positive means for driving or reciprocating the level-wind spool and such means either have been an independent motor or a geared or belted drive in which the power is the same as that which drives the wire or tape. In either event, there had to be rather closely-timed coordination of movement to avoid wire entanglement or the production of undesirable slacks or strains, and this coordination in some cases depended upon the particular size or diameters of the reels, the spools and other elements employed in the particular recording apparatus. Thus, if it were desired to use a reel of a different diameter than that for which the level-wind movement has been preset, it became necessary to adjust the drive accordingly. Such adjustments not only were time-taking, but, in addition, if not properly made, they might affect the operation and fidelity of the instrument.

Another inefficiency apparently considered unavoidable in a number of recorders has been the use of separate level-wind mechanisms, one for the supply reel and the other for the take-up reel. This duplication was brought about by an inability to provide one reel that would operate satisfactorily and this mechanical condition in these reels resulted not only in an additional member but one which would require constant adjustments.

Accordingly, one of the objects of the present invention is to provide a level-wind mechanism which is adapted for use in different sound recording apparatus, or, in other words, in apparatus which employ elements of varying sizes, diameters or driving speeds.

A further object is to provide a single level-wind mechanism capable of serving both the supply and the take-up reels.

Other objects are to provide a level-wind mechanism capable of producing a constant desired tension on the wire or tape and also capable of minimizing wire or tape wear and avoiding such slippage as might impair the fidelity of the recorder.

These and other objects will become apparent from the attached drawing and the accompanying detailed description.

According to the invention the level-wind mechanism is a self-contained unit provided preferably with a rotatable pulley that is substantially encompassed by the driven recording medium which, in turn, drives the pulley and the associated unit by frictional engagement. A single level-wind mechanism may be utilized for both supply and take-up spools by providing two grooves to accommodate a leg of the recording medium path from each spool. The level-wind pulley may be fixed on a floating shaft that drives certain control mechanism, which, in turn, imparts a reciprocating movement to the rotating shaft and pulley to lay the recording medium in level and consecutive layers on the spool being wound. Although the present invention could conceivably be used to advantage where the recording medium is either wire or tape, it is believed to be particularly suitable for use with wire recorders. In the preferred modification, the control mechanism is formed of a worm fixedly mounted on the pulley shaft, and a worm-wheel on which is mounted a cardioid cam adapted to convert the rotation of the wormwheel into a reciprocating force on the rotating pulley shaft.

Figures 2, 3, 4:
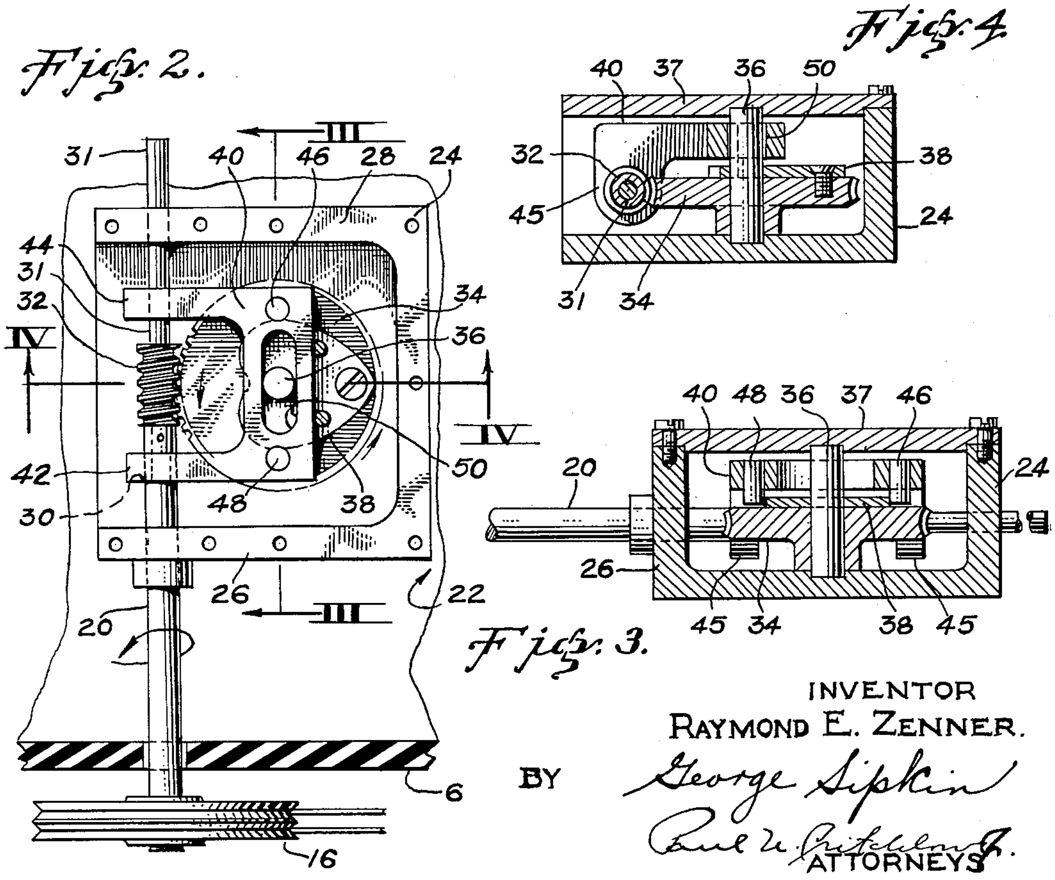

In the drawing, Fig. 1 is a partial front elevation of one type of a sound recorder showing the recording medium threaded on the component parts of the recorder path; Fig. 2 a plan view of the level-wind pulley and control mechanism with the housing cover removed; and Figs. 3 and 4 sections taken along lines III—III and IV—IV, respectively, of Fig. 2.

One type of path on which my novel level-wind mechanism may be used is illustrated in Fig. 1 and comprises a recorder panel 6 on which is supported, on suitable shafting, supply and take-up spools 8 and 10, capstan 12, idler pulley 14, and level-wind pulley 16, all of which form a path for the recording medium 18. In this path, the recording medium is propelled by capstan 12 from one spool to the other around the intermediate elements in either direction of movement. Level-wind pulley 16 is mounted on a shaft 20.

As one of the principal features of the invention, the recording medium drives a self-contained control mechanism adapted to convert the rotary motion of shaft 20 into a reciprocating motion along the shaft axis. Consequently, rotation of shaft 20 reciprocates level-wind pulley 16 and the recording medium it supports, toward and away from the panel. The reciprocating motion of the level-wind pulley enables the recording medium to be wound in smooth and consecutive layers on the spools. The level-wind pulley is positioned between the supply and the take-up spools and enables one level-wind pulley to accommodate both spools. For this reason, the level-wind pulley has a pair of sheaves, each sheave receiving one leg of the recording medium from the spools.

The control mechanism which provides the reciprocable movement of the level-wind pulley is contained in a housing 24 (Figs. 2 to 4 inclusive); level-wind pulley 16 being keyed or otherwise fixed to the outer end of shaft 20 to form an integral assembly rotatably driven in unison by the recording medium. The control mechanism is connected to the level-wind pulley by shaft 20 that extends through recorder panel 6 and through the front and rear walls 26 and 28 of the housing in suitable bearings to enable the shaft to be rotated and reciprocated simultaneously in a manner to be described. Between these housing walls the shaft is provided with a shoulder 30 forming a reduced diameter portion 31 on which is positioned a worm 32 adapted at one end to abut shoulder 30. The worm is formed, preferably, of a sleeve pinned to the reduced shaft portion and it drives a worm-wheel 34 that is rotatably supported by pinion shaft 36 mounted in the base and cover of the housing. A heart-shaped cam 38 (Fig. 2) is pinned to the upper face of the worm-wheel and functions to convert the rotary motion of the worm wheel into a reciprocating movement of shaft 20 through a yoke 40 having legs 42 and 44 which straddle the worm. The legs of the yoke terminate in foot portions 45 (Fig. 4) which space the yoke above the axis of shaft 20 and allow for the location of the worm-wheel and cam. Shaft 20 passes freely through the foot portions to permit rotation and its axial movement by the reciprocating yoke.

Cam 38 drives yoke 40 by bearing against cam follower pins 46 and 48 anchored in the yoke and extending downwardly on opposite sides of the cam. The yoke is guided during the reciprocating motion by the pinion shaft 36, which extends upwardly through the worm-wheel and cam and through an elongated slot 50 in the yoke having a longitudinal centerline parallel to the axis of shaft 20. Another feature to be noted is that the weight of the level-wind mechanism acts as a drag on the recording medium much in the order of a flywheel.

The relative sizes of the worms and the worm-wheel will depend upon the speed reduction that is desired and a ratio of between 30 or 40 to 1 is believed to be satisfactory. However, the worm-wheel should be kept as small as practical to avoid cocking and jamming the work. When it is necessary to make the cam larger in dimension than the worm-wheel, the cam may extend to one side of the worm.

In operation, level-wind pulley 16 and shaft 20 are driven in unison by frictional engagement with the recording medium, the drive being either forward or backward depending upon whether a recording or a rewinding operation is desired. Rotation of worm 32 with shaft 20 drives the worm-wheel and attached cam at a reduced speed and the follower pins being engaged by the cam move the yoke back and forth in a plane parallel to a plane containing the worm and worm-wheel. The direction of yoke movement depends on the relative position of the heart cam which, although driven in one direction throughout the recording or rewinding operation, provides a reversing action by the heart-shaped cam surfaces. Assuming pulley shaft 20 to be rotating counter-clockwise in a recording direction, as indicated in Fig. 2, the worm-wheel rotates in the same counter-clockwise direction and the inclined surface of the cam bears against pin 46 and drives yoke and pulley shaft toward the panel 6 until pin 36 nears one end of slot 50. At this point cam 38 has rotated beyond the high point and the same inclined surface of the cam now bears against pin 48 to drive the yoke and pulley shaft in a reversed direction away from panel 6. It will be noted that pulley shaft 20 rotates in one direction throughout each movement of the recording medium, and, therefore, considering the counterclockwise rotation of the worm-wheel, the axial movement of the pulley shaft must be greater when it is moved by the cam away from panel 6. Accordingly, the amount of axial movement per turn of the shaft is not the same for both directions of axial movement, although this circumstance simply results in variation in the number of turns per layer of recording medium on the spool and has no deleterious effect on the operation of the recorder.

I have thus provided a level-wind mechanism that is driven by the recording medium itself and winds the medium in level and smooth layers on the spools of the recorder. Although the mechanism is advantageously used on sound recorder machines, it is not intended to be so limited. The use of a level-wind pulley enables the recording medium to frictionally drive the level-wind mechanism, and the use of V-shaped grooves in the pulley increases the friction between these parts. The pulley, necessarily, must be fixed to its shaft to transmit the rotational force to the level-wind mechanism to be converted into a reciprocating force to move the pulley axially back and forth with respect to the recorder panel and level-wind the spools. Although there may be other mechanisms than the heart-shaped cam that will accomplish the same result, it should be borne in mind that the mechanism should be small and compact, and one which nevertheless should have sufficient moment of inertia to form a drag on the recording medium by which it is driven.

Obviously, many modifications and variations of the present invention are possible in the light of the above teachings. It is, therefore, to be understood that within the scope of the appended claims the invention may be practiced otherwise than as specifically described.

I claim:

1. Sound recording apparatus comprising a pair of reels, means for moving recording line from one reel to the other, an idler pulley frictionally engaged by said line and disposed between said reels for receiving line directly from one reel and delivering it directly to the other, said pulley being rotatably driven solely in response to its frictional drive, said mechanism including a shaft secured for rotary and reciprocatory movement with said pulley, and means driven by the shaft rotation for reciprocating the shaft, said shaft and pulley being reciprocable in response to frictional drive in either rotational direction whereby said pulley provides a level wind mechanism for either reel.

2. Sound recording apparatus comprising a pair of reels, means for moving recording line from one reel to the other, an idler pulley frictionally engaged by said line and disposed between said reels for receiving line directly from one reel and delivering it directly to the other, said pulley being rotatably driven solely in response to said frictional engagement, and mechanism for reciprocating said pulley solely in response to its frictional drive, said mechanism including a shaft secured for reciprocatory movement with said pulley, a cam driven by said shaft, a cam follower engaged with the shaft, said cam follower being reciprocably driven by the cam for reciprocating the shaft, and said shaft and pulley being reciprocable in response to frictional drive in either rotational direction whereby said pulley provides a level wind mechanism for either reel.

References Cited in the file of this patent

UNITED STATES PATENTS

| | | |
|---|---|---|
| 329,066 | Murphey | Oct. 27, 1885 |
| 1,632,875 | Bouvier | June 21, 1927 |
| 2,305,045 | Torrence | Dec. 15, 1942 |
| 2,500,903 | Neff | Mar. 14, 1950 |
| 2,525,995 | Barbara et al. | Oct. 17, 1950 |
| 2,563,545 | Moreland et al. | Aug. 7, 1951 |
| 2,583,462 | Booth | Jan. 22, 1952 |